United States Patent
Srivathsan et al.

(10) Patent No.: US 12,412,051 B1
(45) Date of Patent: Sep. 9, 2025

(54) DYNAMIC GENERATION OF INSTRUCTIONS FOR MACHINE LEARNING TRANSCREATION TASKS

(71) Applicant: Amazon Technologies, Inc., Seattle, WA (US)

(72) Inventors: Ganapathy S Srivathsan, Kirkland, WA (US); Constantin Daniel Marcu, Rolling Hills, CA (US); Vikram Anbazhagan, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 18/346,101

(22) Filed: Jun. 30, 2023

(51) Int. Cl.
G06F 40/58 (2020.01)
G06F 40/253 (2020.01)

(52) U.S. Cl.
CPC ............ G06F 40/58 (2020.01); G06F 40/253 (2020.01)

(58) Field of Classification Search
CPC ................................ G06F 40/58; G06F 40/253
See application file for complete search history.

(56) References Cited

U.S. PATENT DOCUMENTS

| | | | |
|---|---|---|---|
| 8,145,649 B2 | 3/2012 | Murdock | |
| 9,152,622 B2 | 10/2015 | Marcu | |
| 10,373,191 B2 | 8/2019 | Shinohara | |
| 11,714,972 B2 * | 8/2023 | Srinivasan | G06F 40/47 704/2 |
| 11,875,822 B1 * | 1/2024 | Tripathi | G06V 20/41 |
| 2016/0162478 A1 * | 6/2016 | Blassin | G06Q 10/063112 706/12 |
| 2018/0143975 A1 * | 5/2018 | Casal | G06F 40/51 |
| 2020/0074229 A1 * | 3/2020 | AlShikh | G06F 40/30 |
| 2020/0219489 A1 * | 7/2020 | Stephenson | G06F 40/232 |
| 2023/0071994 A1 * | 3/2023 | Day | G16H 50/20 |
| 2024/0211828 A1 * | 6/2024 | Iwamoto | G06Q 10/063112 |
| 2025/0045536 A1 * | 2/2025 | Bennett | G10L 15/16 |

* cited by examiner

*Primary Examiner* — Kevin Ky
(74) *Attorney, Agent, or Firm* — S. Scott Foster; Kowert, Hood, Munyon, Rankin & Goetzel, P.C.

(57) ABSTRACT

Generative machine learning models may be used to generate a transcreated version of input data. A transcreation request to generate a translated version of the input data may be received. One or more instructions for the input data may be determined based at least in part on an aggregated transcreation style identified for the request. A generative machine learning model may be used to generate the translated version of text in a source natural language that is associated with the input data according to the one or more instructions. The created version of the input data may be provided.

16 Claims, 9 Drawing Sheets

DYNAMIC GENERATION OF INSTRUCTIONS FOR MACHINE LEARNING TRANSCREATION TASKS

BACKGROUND

To facilitate communication across language boundaries, machine translation algorithms and models are often used, especially in circumstances in which manual translation is impracticable. Depending on the pair of languages involved, in some cases a given set of words in one language can be translated by a machine translation model into another language as a technically correct translation but without the correct intent, tone, and style of the original given set of words.

Figure 1:
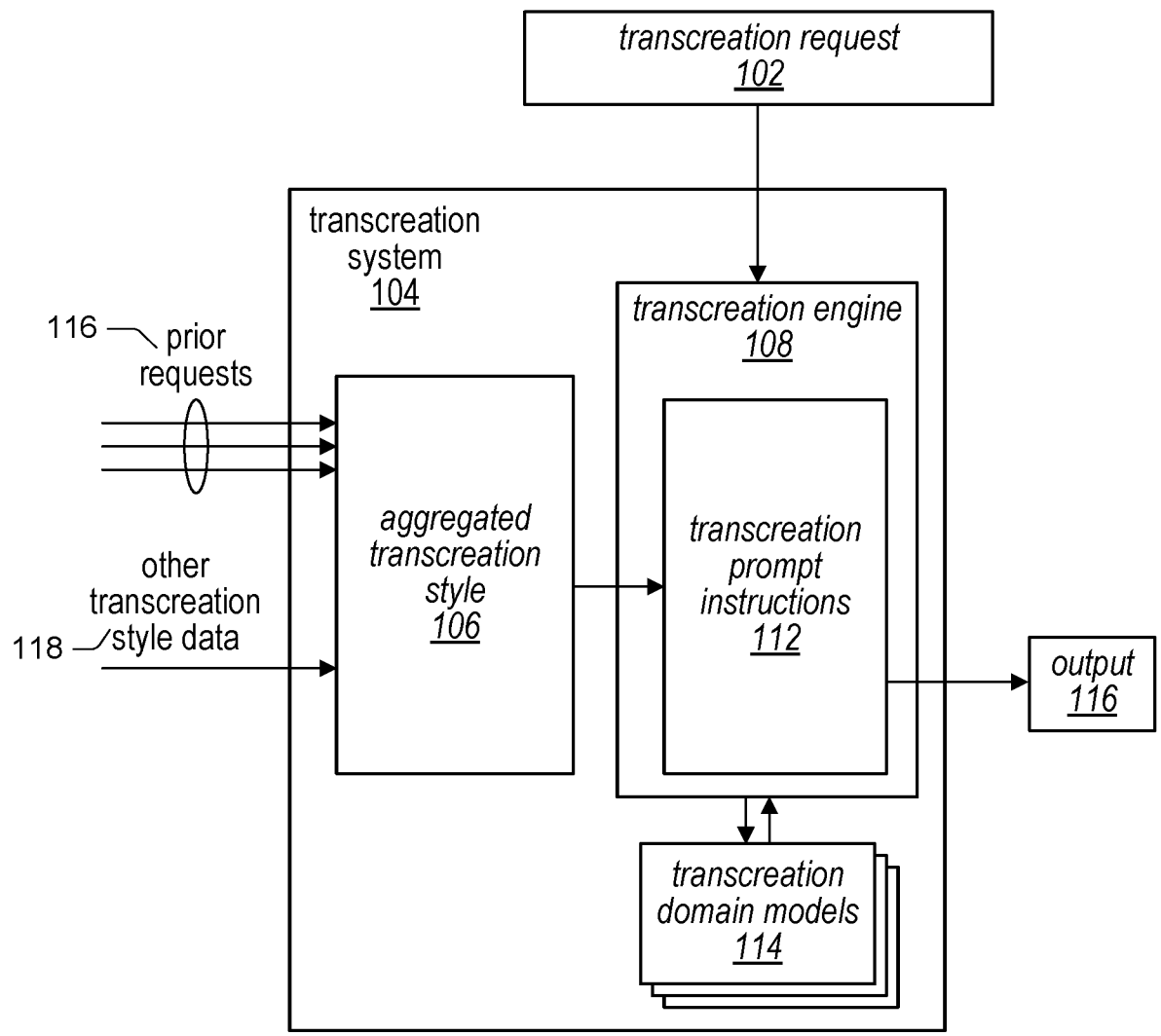
FIG. 1 illustrates a block diagram of a transcreation system that may implement dynamic generation of instructions for machine learning transcreation tasks, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for dynamic generation of instructions for machine learning transcreation tasks are described herein. Machine learning models may generally translate an identified text literally from one natural language to another but can often miss the intent and tone required for most applications. In various embodiments, transcreation tasks are a type of machine learning task that performs a translation that captures the content, intent, and tone without requiring the text to be translated word for word. For instance, the tone of an output from a machine learning model may range depending on the subject or domain of a transcreation request. In addition, while some machine learning models may use prompt responses to adjust their outputs, flaws still affect the user experience. For example, each time a user uses an existing service, multiple responses and iterations of the output may be required each time to reach the desired output. Existing machine learning models without multiple responses from the transcreation requester may produce transcreation outputs of decreased quality.

To address these issues and/or other issues, in some embodiments, a transcreation system may be configured to implement dynamic generation of instructions for machine learning transcreation tasks. In some embodiments the transcreation system may use an aggregated transcreation style. Transcreation style may include information that may be additional to general translation information which may have been used to train a machine learning model that performs transcreation tasks. For example, transcreation style may indicate a shift in emphasis between different target audiences associated with different natural languages (e.g., freedom focused language in one natural language context and community focused language in another natural language context). Typical transcreation techniques manually develop a transcreation style which may be used by human transcreators to accomplish transcreation tasks. However, for machine learning-based approaches, the capacity to update and maintain a transcreation style that aggregates information from across a variety of sources may be used to generate instructions that can be ingested or used differently by a machine learning model or at rates or capacities that exceed the mental capacities of any one human transcreator to use (e.g., hundreds of transcreation examples, past transcreation system requests and responses, many different iterations of transcreation style guides over time).

In order to implement machine learning transcreation tasks, the various sources of transcreation style may be aggregated into an aggregated transcreation style guide, which can adapt over time based on multiple different uses (e.g., by multiple different users) in order to determine transcreation instructions at run-time for different transcreation tasks performed by generative machine learning models. Generative machine learning models may be, in various embodiments, be machine learning models trained on data sets to generate new data based on instructions that prompt the generative machine learning model to use statistical information learned from training data to generate the new data that is similar to or predicted from the prompt. For example, one type of generative machine learning models generate text information, large language models (LLMs), which given a prompt to generate text using input text, style, or other criteria, such as summarize a 10,000 word article into 200 words or less, to generate the text. Similarly, generative machine learning models exist for other data types or modalities (e.g., image data, video data, and audio data).

In various embodiments, techniques for dynamic generation of instructions for machine learning transcreation tasks can take advantage of aggregated transcreation styles that are managed by a transcreation system in order to produce transcreated versions of input data in accordance with a desired transcreation style. Such techniques can adapt the use of generative machine learning model technologies to better conform to transcreation style, improving the performance of generative machine learning models and other computer-related technologies that integrate generative machine learning models with transcreation tasks.

In various embodiments, a transcreation request to generate a transcreated version of input data may be performed using instructions determined from an aggregated transcreation style in order to prompt a generative machine learning model that transcreates into a target natural language. In some embodiments, input data may include or more modalities such as audio, image, video, or text. The generative machine learning model may create new text that is both a translation of and transcreation of text associated with the input data in order to provide a transcreated version of input data (e.g., translating text in an image into a modified image with translated text that satisfies the transcreation style guide (e.g., switching focus from one type of imagery or color palette to another)). The transcreated version of the input may then be provided for user approval, refinement or further processing (e.g., driving downstream processing tasks, such as text to speech, image data generation from text, etc.).

In some embodiments, a response to revise the translated version of the identified text may be received. The metadata for the aggregated transcreation style may be updated for the request and/or response. A second parameter for the identified text may be dynamically generated based at least in part on the updated metadata for the aggregated transcreation style. A revised translated version of the identified text may be generated by the generative machine learning model and then provided. In some embodiments, multiple responses to revise may be received until a desired translated version is achieved.

FIG. 1 illustrates a block diagram of a transcreation system that may implement dynamic generation of instructions for machine learning transcreation tasks, according to some embodiments.

Figure 5A:
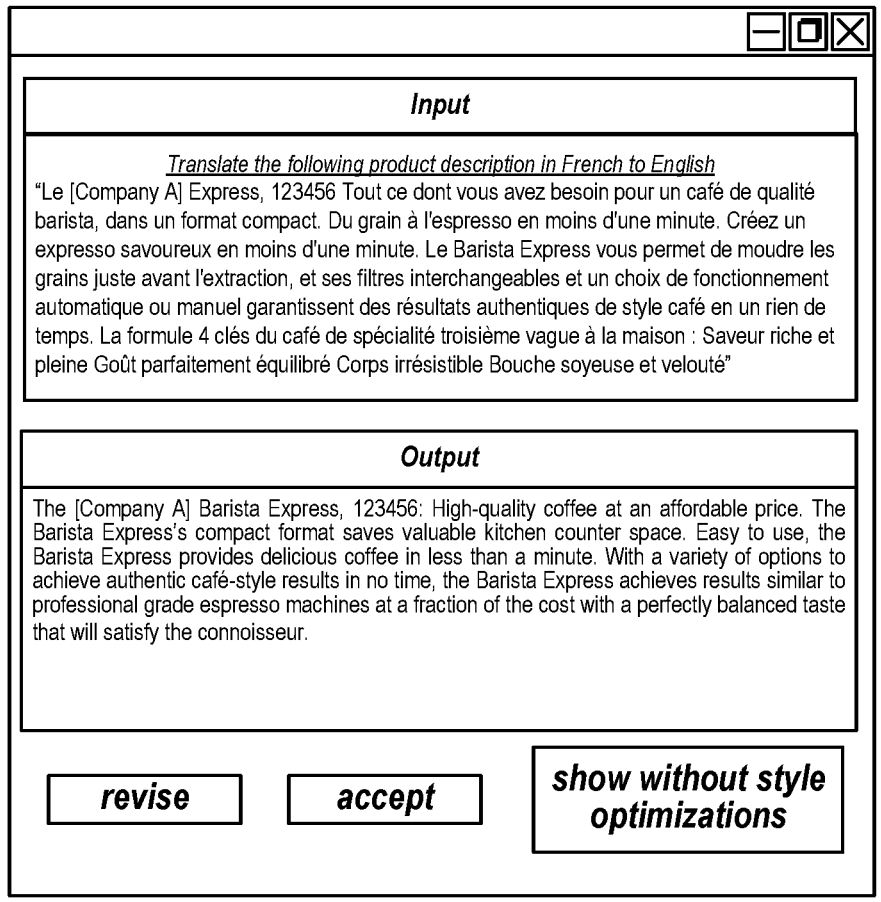
FIG. 5A-B illustrates an example of a user interface of a transcreation service that generates an output after receiving a prompt input and further updates the generated output based on further input responses, according to some embodiments.
Figure 5B:
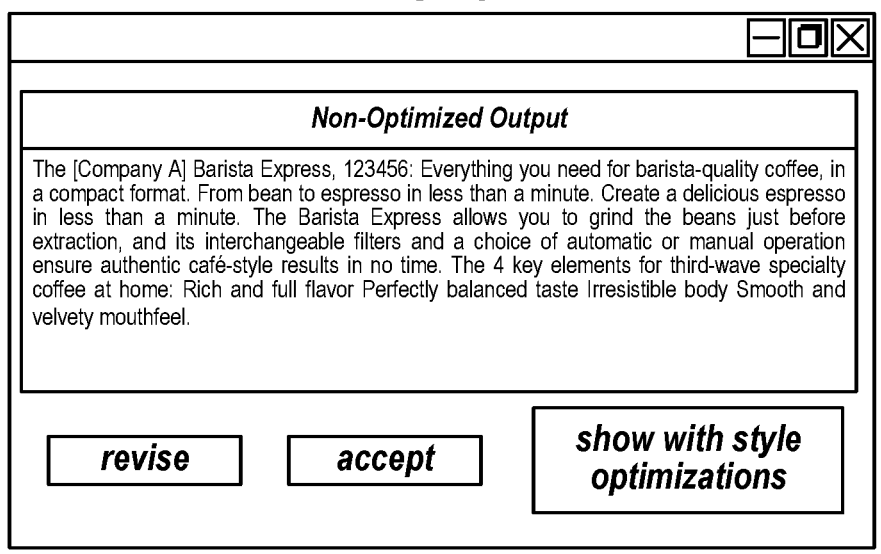

In some embodiments, a transcreation system 104 may include an aggregated transcreation style 106, a transcreation engine 108, and transcreation domain models 114. The transcreation system may be a standalone machine transcreation system, implemented as a publicly available service, like transcreation service 210 discussed below with regard to FIG. 2, or implemented as part of another system or application that utilizes machine transcreations. Transcreation system 104 may generate an output 116 including transcreated/translated text (and other data) in a target language in response to a transcreation request 102 to transcreate input data (e.g., using an example text prompt such as shown in FIG. 5A-C). In some embodiments, the transcreation request 102 may be received by a transcreation engine 108. The source natural language and the target natural language may be specified as part of the transcreation request 102. While in some scenarios, generative machine learning models may be generally trained (e.g., useable across domains), in other embodiments, domain-specific generative machine learning models may be used. For example, a domain may be identified from a selection of domains as part of the transcreation request 102.

Aggregated transcreation style 106 may be aggregated from many different sources. For example, prior requests 116 may be previous interactions with transcreations system 104 that are added to aggregated transcreation style (e.g., to avoid repetitive edits or refinements which may be applied across different users or to entire accounts to generate a consistent and uniform transcreation style). Other transcreation style data 118 may include many other examples and other useful information for aggregated transcreation style 116. For example, examples of transcreation performed from one source natural language into one (or multiple) different target natural languages can be provided, which may illustrate the degree to which different target natural languages have differing transcreation style. In some embodiments, other transcreation style data 118 may include texts of style guides or other communications guidelines or policies. For example, communication policies that outline prohibited words (as well as acceptable alternatives) may be provided. As discussed in detail below with regard to FIG. 3, some transcreation systems may support a rich interface for uploading or otherwise capturing other transcreation style data 118 (as well as capturing prior transcreation revisions other prior requests 116). In some embodiments, aggregation techniques that weight, combine, or otherwise curate the various sources of aggregated transcreation style may be implemented, also discussed below with regard to FIGS. 3 and 8.

Transcreation engine 108 may determine instruction(s) for prompting generative machine learning models, as indicated at 112, which are used to perform transcreation requests, like request 102. Aggregated transcreation style 106 may be used to determine the instructions. For example, in some embodiments, the instructions may be extracted directly from statements in the aggregated transcreation style (e.g., if the aggregated transcreation style includes a style guide with explicit instructions for the target natural language, those statements). In some embodiments, aggregated transcreation style 106 may be used to generate instructions (e.g., "Perform transcreation into target language X based on example A and C [which are then extracted from aggregated transcreation style 106]"). Once determined, the instructions are used to prompt a generative machine learning model to perform a transcreation task that is provided as output 116.

In some embodiments, transcreation may be performed using domain-specific features. For example, generative machine learning models may be transcreation models 114 that are domain-specific. In some embodiments, the domain for request 102 may be identified by extracting features from the transcreation request 102 to determine the domain (e.g., based on the input data itself). In other embodiments, transcreation request 102 may explicitly identify the domain. In various embodiments, domains may include different examples of contexts or scenarios for performing transcreation, such as different industries like pharmaceuticals, lifestyle and entertainment, food and beverages, and fast-moving consumer goods.

This specification continues with a general description of a provider network that implements multiple different services, including a machine transcreation service, which may implement dynamic generation of instructions for machine learning transcreation tasks. Then various examples of, including different components/modules, or arrangements of components/module that may be employed as part of implementing the services are discussed. A number of different methods and techniques to implement dynamic generation of instructions for machine learning transcreation tasks are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
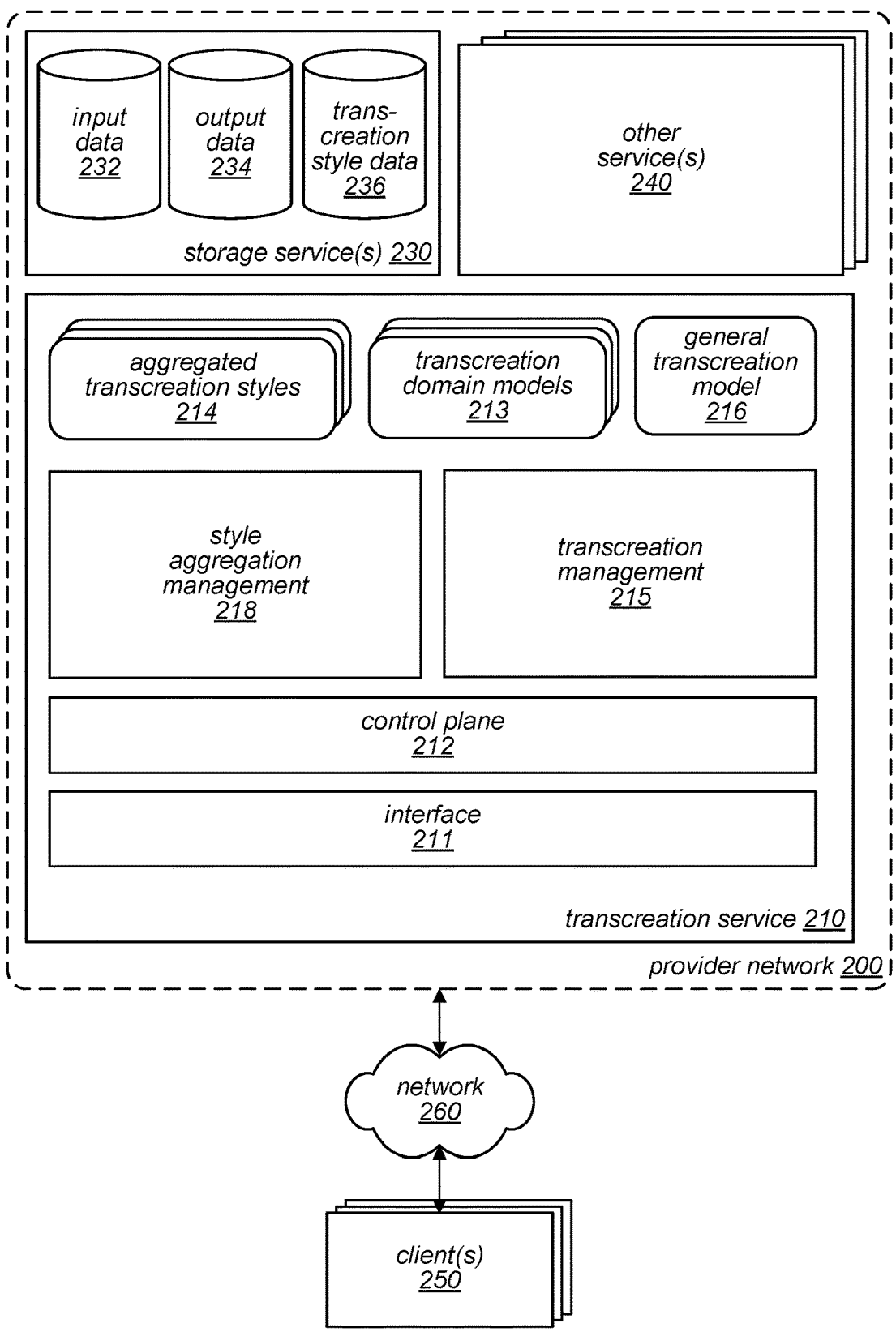
FIG. 2 illustrates an example provider network that may implement a transcreation service that implements dynamic generation of instructions for machine learning transcreation tasks, according to some embodiments.

FIG. 2 illustrates an example provider network that may implement a transcreation service that implements dynamic generation of instructions for machine learning transcreation tasks, according to some embodiments.

Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 900 described below with regard to FIG. 9), needed to implement and distribute the infrastructure and services offered by the provider network 200, in one embodiment. In some embodiments, provider network 200 may implement various computing resources or services, such as transcreation service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below, in one embodiment. In various embodiments, the functionality of a given system or service component (e.g., a component of transcreation service 210 may be implemented by a particular node or may be distributed across several nodes. In some embodiments, a given node may implement the functionality of more than one service system component (e.g., more than one data store component).

Transcreation service 210 may implement interface 211 to allow clients (e.g., client(s) 250 or clients implemented internally within provider network 200, such as a client application hosted on another provider network service like an event driven code execution service or virtual compute service) to send requests to transcreate text. In at least some embodiments, transcreation service 210 may support various types of domain-specified generative machine learning models. For example, transcreation service 210 may implement interface 211 (e.g., a graphical user interface, programmatic interface that implements Application Program Interfaces (APIs) and/or a command line interface) which may be implemented so that a client application can provide or otherwise respond to output data 234, input data 232, and/or transcreation examples 236 to be stored in storage service(s) 230, or other storage locations or sources within provider network 200 or external to provider network 200 (e.g., on premise data storage in private networks). Interface 211 may allow a client to request a transcreation using the techniques discussed above with regard to FIG. 1 and below with regard to FIGS. 3-8.

Transcreation service 210 may implement a control plane 212 to perform various control operations to implement the features of transcreation service 210. For example, control plane 212 may monitor the health and performance of requests at different components of style aggregation management 218 and transcreation management 215. If a node fails, a request fails, or other interruption occurs, control plane 212 may be able to restart a job to complete a request (e.g., instead of sending a failure response to the client). Control plane 212, in some embodiments, may arbitrate, balance, select, or dispatch requests to different node(s) in various embodiments. For example, control plane 212 may receive requests interface 211 which may be a programmatic interface and identify an available node to begin work on the request.

Transcreation management 215 may implement various machine transcreation features and techniques, including custom machine learning translation utilizing domain specific models and an aggregated style, such as transcreation domain models 213 which may be generated machine learning models that are specific to particular domains, general transcreation model 216, which may not be domain-specific, and aggregated styles 214. Style aggregation management 218 may implement various computing resources, features, and techniques to create and update the aggregated style 214 using input data 232, output data 234, and transcreation examples 236. Input data may include prior and current transcreation requests and output data may include transcreated data generated by the transcreation domain models 213 or general transcreation model 216.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. Data storage service(s) 230 may be accessed via programmatic interfaces (e.g., APIs) or graphical user interfaces. Input data 232, output data 234 and transcreation examples 236 may be put and/or retrieved from data storage service(s) 230 via an interface for data storage services 230, in some embodiments.

Generally speaking, clients 250 may encompass any type of client that can submit network-based requests to provider network 200 via network 260, including requests for transcreation service 210 (e.g., a request to update an aggregated style guide or a request to perform transcreation). For example, a given client 250 may include a suitable version of a web browser or may include a plug-in module or other type of code module that can execute as an extension to or within an execution environment provided by a web browser. Alternatively, a client 250 may encompass an application (or user interface thereof), a media application, an office application or any other client application that may make use of machine translation service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like transcreation service 210) via network 260, in one embodiment. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
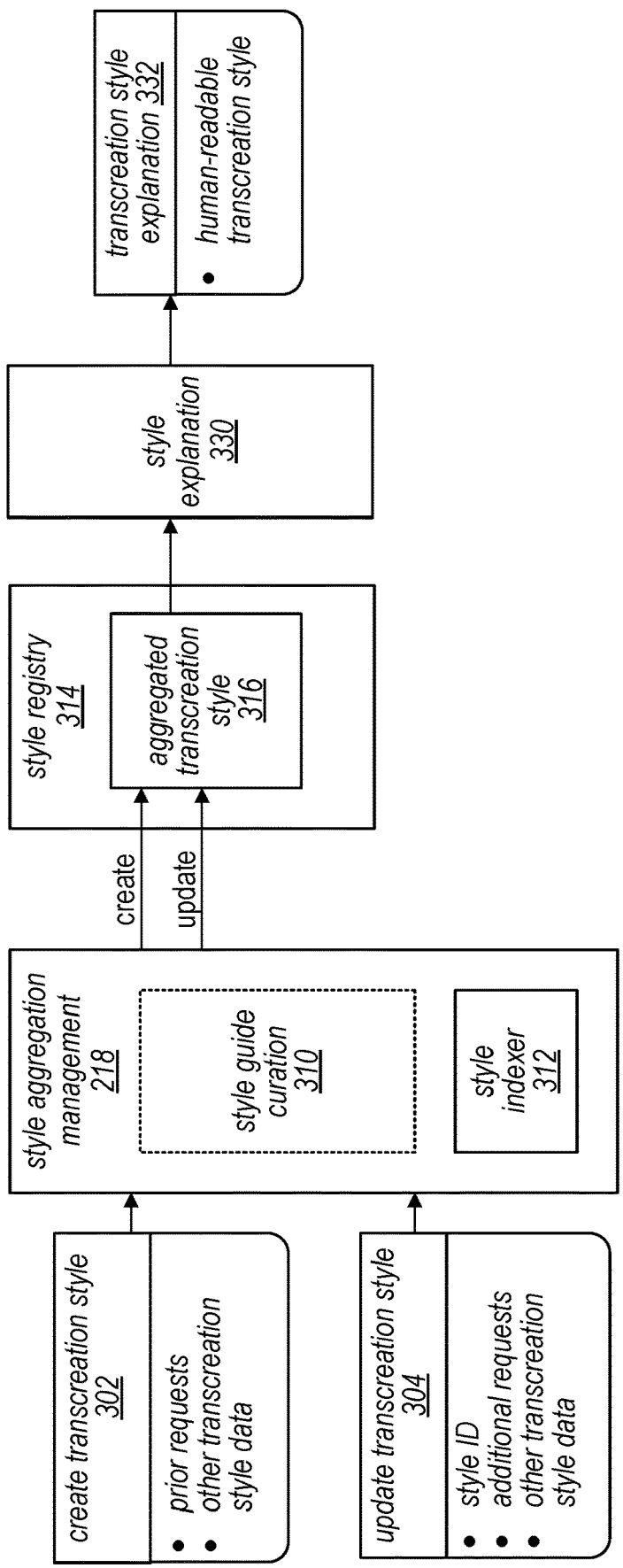
FIG. 3 illustrates a block diagram of style aggregation management that extracts features, modifies a style guide, and indexes a style in order to create or update the style for dynamic generation of instructions for machine learning transcreation tasks, according to some embodiments.

As noted above, transcreation service 210 may implement style aggregation management 218 to allow for creating and updating a transcreation style for generating transcreation outputs that are performed by transcreation service 210. FIG. 3 illustrates a block diagram of style aggregation management that extracts features, modifies a style guide, and/or otherwise curates a style guide and indexes a style in order to create or update the style, according to some embodiments.

Interface 211 may support various requests to provide information to style aggregation management 218 including prior transcreation requests, transcreation examples, responses to transcreation outputs, and manual update requests. In some embodiments a request to create a transcreation style 302 may be received by style aggregation management 218. The request to create may include inputs such as prior requests and/or other transcreation style data (e.g., as discussed above with regard to FIG. 1). In some embodiments, a request to update a transcreation style 304 may be received by style aggregation management 218. The request 218 to update may include similar information, such as additional requests or other transcreation style data (e.g., updated style guidelines). The request may include an identifier provided by style indexer 312 in response to creation request 302.

In some embodiments, style aggregation management 218 may pass through prior requests and other transcreation style data directly through to style registry 314 to create or update the appropriate aggregated transcreation style 316. In some embodiments, style aggregation management 218 may implement style guide curation 310, which may perform various operations to evaluate, extract, or perform other processing on provided data for transcreation style in order to create or updated aggregated transcreation style 316. For example, style guide curation 310 may be used to extract features from inputs provided with the request for creating/updating a style 316. The features extracted may include but are not limited to, tone, literary devices, text, symbols, and audio. For example, an enthusiastic tone feature may be extracted from prior requests. In another example, if alliteration is used in most of the transcreation examples, then the literary device may be extracted as a feature for updating/creating the style 316. In some embodiments, style guide curation 310 may filter various information included in creation 302 or update 304 requests (e.g., offensive or outdated style content). As discussed in detail below with regard to FIG. 8, weighting or other management schemes may be applied to prioritize some style data over others. In some embodiments, style guide curation 310 may remove some data from aggregated transcreation style 316 (e.g., according to age).

In some embodiments, style indexer 312 assigns an identifier to every style created. Identifiers can then be used for identifying which style to use when generating a transcreation output. In some embodiments, style indexer 312 may generate index structures to make aggregated transcreation style 316 searchable, in some embodiments. For example, an inverted index data structure may be created to perform efficient searches on aggregated transcreation style (e.g., for specific statements or other information).

In some embodiments, access to aggregated transcreation style 316 may be provided for analysis or viewing by users. For example, requests for transcreation style may be received and handled by a feature, such as style explanation 330. Style explanation 330 may access aggregated transcreation style 316 and generate transcreation style explanation 332, which may include a human-readable transcreation style, in some embodiments. For example, a machine learning language model (e.g., an LLM) may be used to generate a text summary of aggregated transcreation style 316, in some embodiments, then provide the human-readable transcreation style. In some embodiments, style explanation 330 may use an index structure for aggregated transcreation style (e.g., generated by style indexer 312) to find and return human readable portions of aggregated transcreation style 316.

Figure 4:
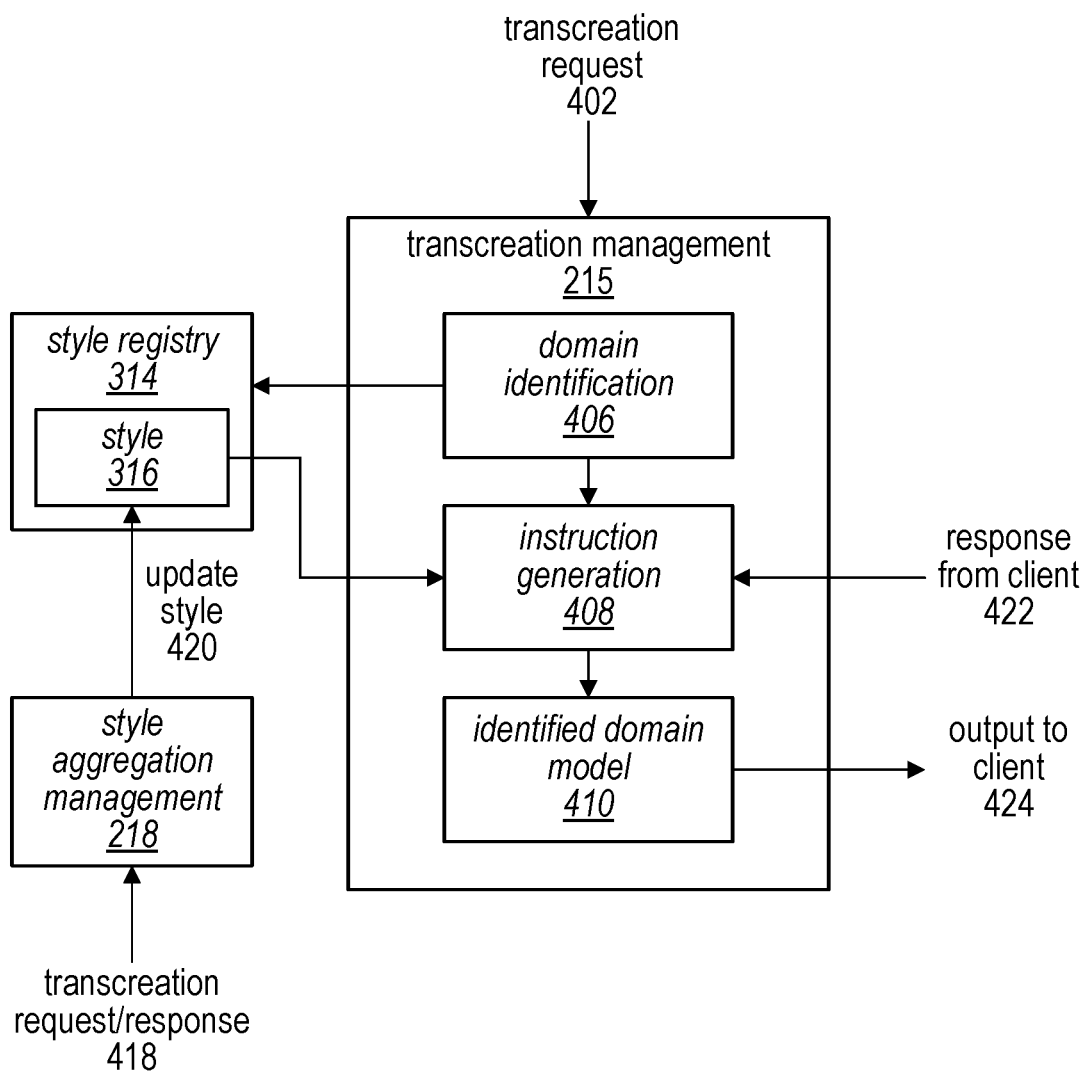
FIG. 4 illustrates a block diagram of transcreation management of a machine language service that implements domain identification, parameter generation, and execution of a domain model for transcreation requests and responses from a client for dynamic generation of instructions for machine learning transcreation tasks, according to some embodiments.

As discussed above, transcreation service 210 may implement transcreation management 215 to perform transcreation tasks on behalf of various clients. As part of performing translation tasks, transcreation management 215 may include components to implement generating a transcreation output using an identified domain model 410 according to generated parameters. FIG. 4 illustrates a block diagram of transcreation management of a machine language service that implements domain identification, instruction generation, and execution of a domain model for transcreation requests and responses from a client, according to some embodiments.

A transcreation request 402 may be received by transcreation management 215. Domain identification 406 may be performed and the identified domain may be provided to style registry 314 and instruction generation 408. In some embodiments, the domain may be identified through feature extraction of the transcreation request 402. In some embodiments, the domain may be identified in the transcreation request 402 from a selection of domains. In some embodiments, the style registry 314 may identify the style 316 based on the identified domain. The style 316 may be provided for instruction generation 408. The generated instructions may be included in a prompt that is made to an identified domain model 410 (e.g., via an interface of a host system for the identified domain model 410) to generate an output to client 424. In some embodiments, the client may respond to this output. The response from the client 422 may be provided for further instruction generation 408 to generate a revised output. In some embodiments, the output to the client 424 may be revised multiple times according to responses from the client 422 until the client is satisfied with the output and no longer provides a response.

In some embodiments, the transcreation request and/or response(s) 418 may be provided to style aggregation management 218. The style aggregation management 218 may then update the style 420.

FIG. 5A-B illustrates an example of a user interface of a transcreation service that generates a transcreated version of given text with and without aggregated style to optimize the result, according to some embodiments.

In various embodiments, a user may input their transcreation request in the input section. The transcreation request may include identified text and action(s) to perform on the identified text. The transcreation service 210 may then respond with a generated transcreated version of the identified text in the output section that uses aggregated transcreation style to determine and provide instructions (in addition to or in modification of those given in input). In some embodiments, the user may choose to revise and therefore respond with further instructions for the transcreation service, shown in C, or the user may choose to accept the original generated transcreated version of the identified text. In some embodiments, such as FIG. 5A, the user may request text to be translated into another language. The user may request different revisions such as the identified text length to be shortened or lengthened, to be written in a specific style, and/or to add or take out content.

In some embodiments, various features of the user interface may support toggling on or off the effects of aggregated style guide on the output result (e.g., to compare and contrast generic transcreation with the optimized version provided by using an aggregated transcreation style to determine instructions for prompting generative machine learning models to perform transcreation. For example, element to show the version without optimization may be selected and the result shown in FIG. 5B. The depicted non-optimized output may be closer to a word-by-word translation of the input text and thus may not reflect various transcreation style choices as the generative machine learning model may not be guided to those style features. While many subsequent revisions and further instructions could be performed, the use of an aggregated transcreation style can significantly reduce the number of edits as well as ensure that desired stylistic choices may be enforced across a wide variety of users and uses (e.g., for different input text for different products from the same company).

Figure 6:
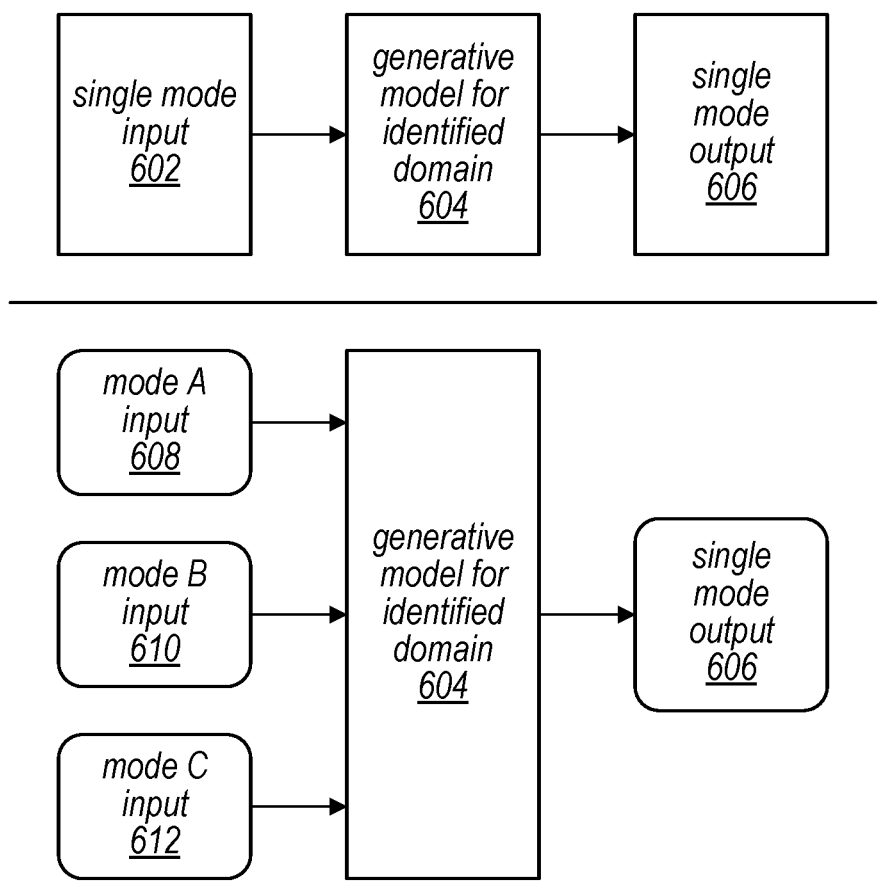
FIG. 6 illustrates examples of input and output for a generative model for an identified domain that makes use of dynamic generation of instructions for machine learning transcreation tasks for single modal or multi-modal inputs, according to some embodiments.

FIG. 6 illustrates examples of input and output for a generative model for an identified domain, wherein the input includes single modal or multi-modal inputs.

As discussed above with regard to FIG. 1, input data for transcreation may include various types of data (including model types of data). Accordingly, different types of generate machine learning models may be used that correspond to different modalities of inputs and outputs, such as shown in FIG. 6. The generative model for the identified domain 604 may also act as one of the transcreation domain models 114 in FIG. 1, one of the transcreation domain models 213 in FIG. 2, and/or the identified domain model 410 in FIG. 4. In some embodiments, a single mode input 602 (e.g., text-only, image data only, etc.) may be received by the generative model for the identified domain 604 and a single mode output 606 may be generated. In some embodiments, multiple mode inputs (A 608, B 610, C 612) may be received by the generative model for the identified domain 604 and the model may generate a single mode output 606. In some embodiments, the multiple mode outputs may be generated by the model. Different examples of modes may include text, audio, video, and image.

Although FIGS. 2-6 have been described and illustrated in the context of a provider network implementing a machine transcreation service, the various components illustrated and described in FIGS. 2-6 may be easily applied to other systems that implement machine translation, either stand-alone systems or implemented as a feature of a larger application.

Figure 7:
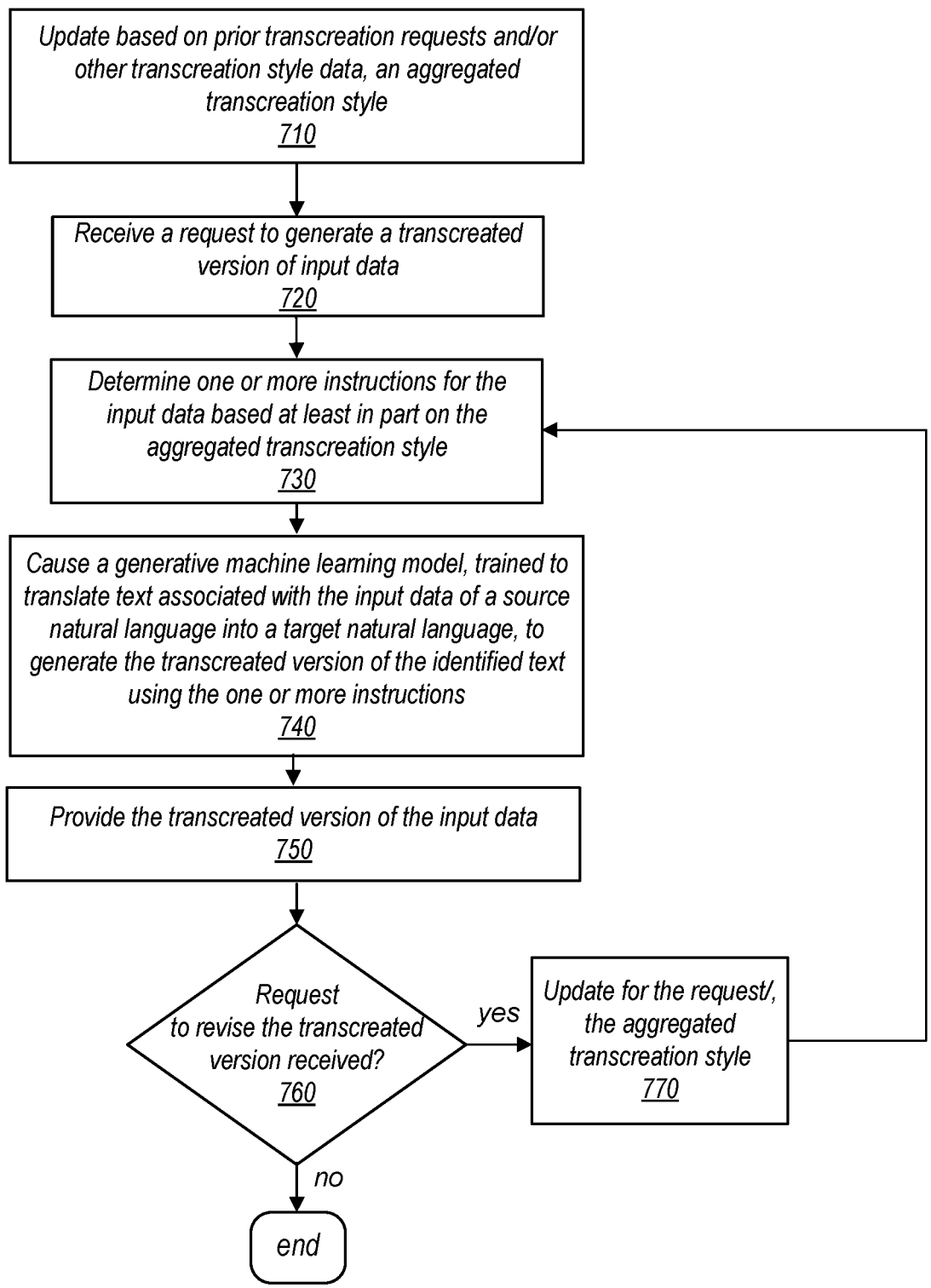
FIG. 7 illustrates a flowchart of various methods and techniques to implement dynamic generation of instructions for machine learning transcreation tasks, according to some embodiments.

FIG. 7 illustrates a flowchart of various methods and techniques to implement dynamic generation of instructions for machine learning transcreation, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

In some embodiments, a process for generating a transcreated version of an identified text may resemble a process such as that which is shown in FIG. 7. In some embodiments, in block 710, an aggregated transcreation style may be updated according to various different information. For example, prior transcreation requests and/or other transcreation data (e.g., transcreation examples, transcreation or style guides, etc.). In block 720, a transcreation request may then be received to generate a translated version of input data. As discussed above, input data may include one or multiple types of data (e.g., video data (with audio) and text included in the video). In block 730, one or more instructions for the identified text may then be determined based at least in part on the aggregated transcreation style. For example, as discussed above, statements from the aggregated transcreation style may be extracted and included in instructions or new instructions may be generated that reference content (or include it) from aggregated transcreation style. In some embodiments, the entirety of aggregated transcreation style may be included in instructions (e.g., "Generated a transcreated version of the input data into a target natural language using the following style information: . . . ").

In block 740, a generative machine learning model, trained to translate text of a source natural language associated with the input data into a target natural language, may then be caused to generate the transcreated version of the input data according to the determined one or more instructions. In some embodiments, the generative machine learning may be domain-specific and determined or selected (out of a multiple supported domains) according to the request to generate the transcreated version of the input data.

In block 750, the translated version of the input data may be provided (e.g., via a user interface or to a recipient specified in the request). A received response from the user may be checked for in block 760. For a received response, the aggregated transcreation style may be updated (e.g., according to the revision), shown in block 770. According to the loopback to block 740, further instruction(s) may be generated for the identified text based at least in part on the updated aggregated transcreation style. Blocks 740-760 may then be repeated. No received response from block 760 ends the process.

Figure 8:
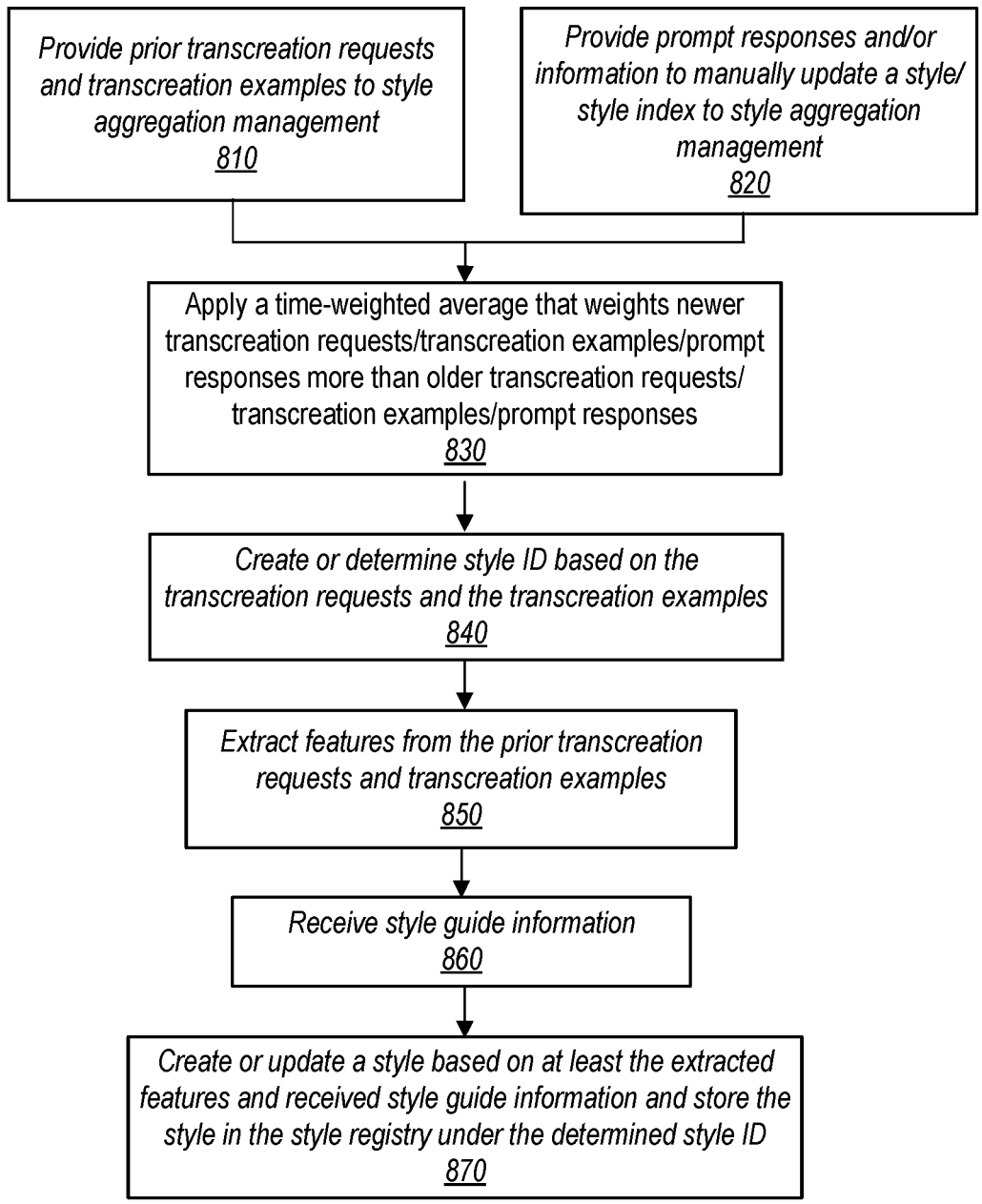
FIG. 8 illustrates a flowchart of various methods and techniques for creating or updating a style used for dynamic generation of instructions for machine learning transcreation tasks, according to some embodiments.

FIG. 8 illustrates a flowchart of various methods and techniques for creating or updating a style used for machine transcreations, according to some embodiments.

In some embodiments, a process for managing an aggregated transcreation style may resemble a process such as that which is shown in FIG. 8. In block 810, prior transcreation requests and transcreation examples may be provided to style aggregation management. In block 820, prompt responses and/or information to manually update a style/style index may be provided to style aggregation management. In block 830, a time-weighted average may be applied that weights newer transcreation request/transcreation examples/prompt responses more than older transcreation requests/transcreation examples/prompt responses. In block 840, a style ID may be created or determined based on the transcreation requests and the transcreation examples. In block 850, features may be extracted from the prior transcreation requests and transcreation examples. In block 860, style guide information may be received. In block 870, a style may be created or updated based on at least the extracted features and received style guide information and then the style may be stored in the style registry under the determined style ID.

The methods described herein may in various embodiments be implemented by any combination of hardware and software. For example, in one embodiment, the methods may be implemented on or across one or more computer systems (e.g., a computer system as in FIG. 9) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
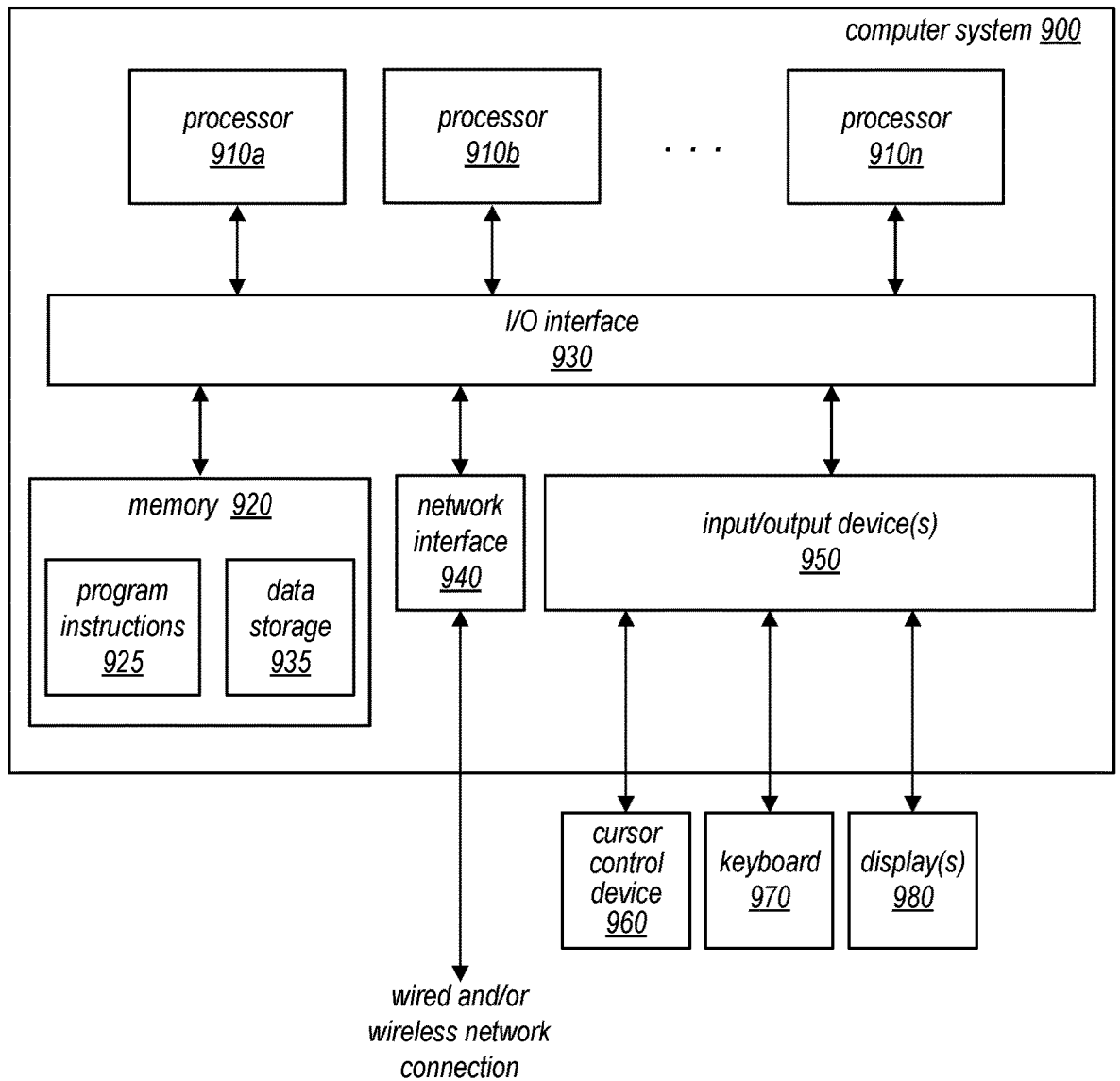
FIG. 9 illustrates an example system to implement the various methods, techniques, and systems described herein, according to some embodiments.

FIG. 9 illustrates an example system to implement the various methods, techniques, and systems described herein, according to some embodiments.

Embodiments generating transcreated output using machine translation models according to an aggregated style and generated parameters as described herein may be executed on one or more computer systems, which may interact with various other devices. One such computer system is illustrated by FIG. 9. In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. Display(s) 980 may include standard computer monitor(s) and/or other display systems, technologies, or devices. In at least some implementations, the input/output devices 950 may also include a touch- or multi-touch enabled device such as a pad or tablet via which a user enters input via a stylus-type device and/or one or more digits. In some embodiments, it is contemplated that embodiments may be implemented using a single instance of computer system 900, while in other embodiments multiple such systems, or multiple nodes making up computer system 900, may host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 920 may store program instructions and/or data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as style aggregation management and transcreation management as described above are shown stored within system memory 920 as program instructions 925 and data storage 935, respectively. In other embodiments, program instructions and/or data may be received, sent, or stored upon different types of computer-accessible media or on similar media separate from system memory 920 or computer system 900. Generally speaking, a non-transitory, computer-readable storage medium may include storage media or memory media such as magnetic or optical media, e.g., disk or CD/DVD-ROM coupled to computer system 900 via I/O interface 930. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, that implement the various methods and techniques as described herein, including the generation of a translated version of identified text using transcreation learning models and data storage 935, comprising various data accessible by program instructions 925. In one embodiment, program instructions 925 may include software elements of embodiments as described herein and as illustrated in the Figures. Data storage 935 may include data that may be used in embodiments. In other embodiments, other or different software elements and data may be included.

Those skilled in the art will appreciate that computer system 900 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A transcreation system for producing transcreated versions of input data in accordance with a desired transcreation style, comprising:
    at least one processor; and
    a memory, storing program instructions that when executed by the at least one processor, cause the at least one processor to implement the transcreation system, configured to:
        update, based on a plurality of prior transcreation requests received via an interface of the transcreation system, metadata for an aggregated transcreat ion style based on one or more transcreation examples received via the interface of the transcreation system;
        receive, via the interface of the system, a transcreation request to generate a transcreated version of an identified text;
        identify a transcreation domain for the transcreation request out of a plurality of transcreation domains supported by the transcreation system,
        generate one or more instructions to perform the transcreation request for the identified text based at least in part on the metadata for the aggregated transcreation style;
        cause a generative machine learning model, trained to translate text input into a target language for the identified transcreation domain, to generate the transcreated version of the identified text according to the generated one or more instructions; and
        provide, via the interface, the transcreated version of the identified text.

2. The system of claim 1, wherein to identify the transcreation domain, the transcreation service is configured to receive a selection of the transcreation domain as part of the transcreation request.

3. The system of claim 1, wherein to update the metadata for the aggregated transcreation style, the transcreation system is configured to apply a time-weighted average that weights transcreation requests according to when the transcreation requests were received.

4. A transcreation method for producing transcreated versions of input data in accordance with a desired transcreation style, comprising:
    updating, based on a plurality of prior transcreation requests received via an interface of a transcreation system, metadata for an aggregated transcreation style based on one or more transcreation examples received via the interface of the transcreation system;
    receiving, via an interface of the transcreation system, a request to generate a transcreated version of input data;
    identifying a transcreation domain for the transcreation request out of a plurality of transcreation domains supported by the transcreation system,
    determining, by the transcreation system, an instruction for performing the transcreation request for the input data based, at least in part, on the metadata for the aggregated transcreation style identified for the request;
    causing, by the transcreation system, a generative machine learning model, trained to translate text in a source natural language associated with the input data into a target natural language to generate the transcreated version of the input data using the determined instruction; and
    providing, via the interface of the transcreation system, the transcreated version of the input data.

5. The method of claim 4, wherein updating the aggregated transcreation style comprises applying a time-weighted average to the plurality of prior transcreation requests according to when the plurality of prior transcreation requests are received.

6. The method of claim 4, further comprising identifying, by the transcreation system, a transcreation domain for the request out of a plurality of transcreation domains supported by the transcreation system based, at least in part, on the request, wherein the generative machine learning model is trained for the identified transcreation domain.

7. The method of claim 4, further comprising:
    receiving a request to revise the generated transcreated version of the input data;
    updating the aggregated transcreation style according to the request to revise the generated transcreated version of the identified text;
    causing the generative machine learning model to generate a revised transcreated version of the input data according to the request to revise the generated transcreated version of the identified text; and
    providing, via the interface of the system, the revised transcreated version of the identified text.

8. The method of claim 4, wherein the input data comprises audio data, image data, or video data.

9. The method of claim 4, wherein the input data comprises the text associated with the input data as text data.

10. One or more non-transitory, computer-readable storage media, storing program instructions that when executed on or across one or more computing devices cause the one or more computing devices to implement a transcreation method for producing transcreated versions of input data in accordance with a desired transcreation style comprising:
    updating, based on a plurality of prior transcreation requests received via an interface of a transcreation system, metadata for an aggregated transcreation style based on one or more transcreation examples received via the interface of the transcreation system;
    receiving, via an interface, a request to generate a transcreated version of input data;
    identifying a transcreation domain for the transcreation request out of a plurality of transcreation domains supported by the transcreation system,
    determining one or more instructions for performing the transcreation request for the input data based, at least in part, on the metadata for the aggregated transcreation style, identified for the request;
    causing a generative machine learning model, trained to translate text in a source natural language associated with the input data into a target natural language for an identified trans creation domain, to generate the transcreated version of the input data using the determined instruction; and
    providing, via the interface, the transcreated version of the input data.

11. The non-transitory, computer-readable medium storing program instructions of claim 10, wherein in determining the one or more instructions, the program instructions cause the one or more computing devices to implement extracting one or more statements from the aggregated transcreation style to use as the one or more instructions.

12. The one or more non-transitory, computer-readable storage media of claim 10, storing further instructions that when executed on or across the one or more computing devices, cause the one or more computing devices to further implement:
    generating, by the transcreation system, a human-readable explanation of the aggregated transcreation style responsive to a request for the aggregated transcreation style.

13. The non-transitory, computer-readable medium storing program instructions of claim 10, wherein in determining the one or more instructions, the program instructions cause the one or more computing devices to implement generating one or more new statements based on existing statements in the aggregated transcreation style to use as the one or more instructions.

14. The non-transitory, computer-readable medium storing program instructions of claim 10, wherein the programming instructions when executed on or across the one or more processors, cause the one or more computing devices to further implement identifying a transcreation domain for the request, wherein the generative machine learning model is trained for the identified transcreation domain.

15. The one or more non-transitory, computer-readable storage media of claim 10, wherein the request specifies the target natural language out of a plurality of supported target natural languages.

16. The one or more non-transitory, computer-readable storage media of claim 10, wherein the one or more computing devices are implemented as part of a provider network that provides a transcreation service, wherein the request to generate the transcreation version is received via graphical user interface implemented as part of the transcreation service, and wherein the transcreated version of the input data is displayed via the graphical user interface.

* * * * *